(12) United States Patent
Pardivala et al.

(10) Patent No.: US 11,897,197 B2
(45) Date of Patent: Feb. 13, 2024

(54) HEATED PLATE FOR A THREE-DIMENSIONAL PRINTER

(71) Applicant: Essentium, Inc., Pflugerville, TX (US)

(72) Inventors: Natalie Pardivala, Round Rock, TX (US); Nirup Nagabandi, Pflugerville, TX (US)

(73) Assignee: ESSENTIUM IPCO, LLC, Pflugerville, TX (US)

( * ) Notice: Subject to any disclaimer, the term of this patent is extended or adjusted under 35 U.S.C. 154(b) by 0 days.

(21) Appl. No.: 17/478,048

(22) Filed: Sep. 17, 2021

(65) Prior Publication Data

US 2023/0092527 A1    Mar. 23, 2023

(51) Int. Cl.
| | |
|---|---|
| *B29C 64/295* | (2017.01) |
| *B33Y 30/00* | (2015.01) |
| *B29C 64/188* | (2017.01) |
| *B33Y 50/02* | (2015.01) |
| *B29C 64/393* | (2017.01) |
| *B29C 64/209* | (2017.01) |

(52) U.S. Cl.
CPC .......... *B29C 64/295* (2017.08); *B29C 64/188* (2017.08); *B29C 64/209* (2017.08); *B29C 64/393* (2017.08); *B33Y 30/00* (2014.12); *B33Y 50/02* (2014.12)

(58) Field of Classification Search
CPC ... B29C 64/118; B29C 64/209; B29C 64/295; B29C 64/386–393; B33Y 40/00–20; B33Y 50/00–02
See application file for complete search history.

(56) References Cited

U.S. PATENT DOCUMENTS

| | | | |
|---|---|---|---|
| 11,135,771 B1* | 10/2021 | Reith | B33Y 10/00 |
| 2015/0352787 A1 | 12/2015 | Humbert et al. | |
| 2016/0332382 A1 | 11/2016 | Coward et al. | |
| 2017/0072632 A1 | 3/2017 | Page et al. | |
| 2017/0334137 A1* | 11/2017 | Nystrom | B29C 64/393 |
| 2018/0117834 A1* | 5/2018 | Murao | B29C 64/209 |
| 2018/0345577 A1* | 12/2018 | Takeyama | B29C 64/118 |

(Continued)

OTHER PUBLICATIONS

Ravi. "A Study on an In-Process Laser Localized Pre-Deposition Heating Approach to Reducing FDM Part Anisotropy," Arizona State University, Aug. 2016, pp. 1-66.

(Continued)

*Primary Examiner* — Matthew J Daniels
*Assistant Examiner* — Andrew L Swanson
(74) *Attorney, Agent, or Firm* — Vivacqua Crane, PLLC (57) ABSTRACT

A three-dimensional printer for generating a printed component, includes a build substrate defining a surface that supports the printed component and a heated nozzle including a nozzle body. The heated nozzle is configured to deposit a build material upon either the build substrate or the printed component. The three-dimensional printer also includes a heated plate including one or more heating elements and a main body that defines an opening for receiving the nozzle body of the heated nozzle. The one or more heating elements are configured to heat at least a portion of the heated plate to a predefined temperature, where a volume of hot air is created between the heated plate and the printed component when the heated plate is heated to the predefined temperature.

20 Claims, 5 Drawing Sheets

(56) References Cited

U.S. PATENT DOCUMENTS

| | | | |
|---|---|---|---|
| 2019/0105622 A1 | 4/2019 | Lewis et al. | |
| 2019/0201978 A1* | 7/2019 | Oftedal | B22F 12/10 |
| 2020/0039140 A1* | 2/2020 | You | B29C 64/245 |
| 2020/0298492 A1 | 9/2020 | Yirmibesoglu et al. | |
| 2020/0316866 A1* | 10/2020 | Jain | B33Y 40/10 |
| 2021/0060863 A1 | 3/2021 | Rudolph et al. | |
| 2022/0072781 A1* | 3/2022 | Taylor | B29C 64/241 |
| 2023/0011639 A1* | 1/2023 | LeFevre | B22F 12/13 |
| 2023/0012088 A1* | 1/2023 | LeFevre | B22F 10/368 |
| 2023/0241838 A1* | 8/2023 | Birbilis | B29C 48/02 |
| | | | 264/349 |

OTHER PUBLICATIONS

International Searching Authority. International Search Report and Written Opinion for PCT Applicationno. PCT/US2022/038060, dated Jan. 3, 2023.

\* cited by examiner

HEATED PLATE FOR A THREE-DIMENSIONAL PRINTER

FIELD

The present disclosure is directed to a heated plate for a three-dimensional printer that generates a printed component. More specifically, the present disclosure is directed towards a heated plate for a three-dimensional printer that creates a volume of hot air between the heated plate and a printed component. The volume of hot air locally reheats a portion of the printed component, thereby improving a thermal history of the printed component.

BACKGROUND

The statements in this section merely provide background information related to the present disclosure and may or may not constitute prior art.

Three-dimensional printing, which may also be referred to as additive manufacturing, generates printed components based on computer models. In one approach, a printed component may be created by depositing a feedstock, such as a thermoplastic filament, through a heated nozzle in successive layers upon a base plate. Additive manufacturing techniques may be used to generate large, relatively complex components. However, since additive manufacturing techniques involve building parts layer by layer, the resulting printed components exhibit anisotropic mechanical properties. Specifically, a tensile strength measured in the build direction of the printed component is usually significantly less when compared to the tensile strength measured in an out of plane direction, which is a direction perpendicular to the build direction. The tensile strength in the out of plane direction may also be referred to as the z-directional strength or simply the z-strength of the printed component.

Thus, while current three-dimensional printing techniques achieve their intended purpose, there is a need for an approach to improve the interlayer bonding in a printed component, which in turn increases the z-strength of the printed component.

SUMMARY

According to several aspects, a three-dimensional printer for generating a printed component is disclosed. The three-dimensional printer includes a build substrate defining a surface that supports the printed component and a heated nozzle. The heated nozzle includes a nozzle body. The heated nozzle is configured to deposit a build material upon either the build substrate or the printed component. The three-dimensional printer also includes heated plate including one or more heating elements and a main body that defines an opening for receiving the nozzle body of the heated nozzle. The one or more heating elements are configured to heat at least a portion of the heated plate to a predefined temperature, where a volume of hot air is created between the heated plate and the printed component when the heated plate is heated to the predefined temperature In another aspect, a three-dimensional printer for generating a printed component is disclosed. The three-dimensional printer includes a build substrate defining a surface that supports the printed component and a heated nozzle. The heated nozzle includes a nozzle body. The heated nozzle is configured to deposit a build material upon either the build substrate or the printed component. The three-dimensional printer also includes a heated plate including one or more heating elements and a main body that defines an opening for receiving the nozzle body of the heated nozzle. The one or more heating elements are configured to heat at least a portion of the heated plate to a predefined temperature, where a volume of hot air is created between the heated plate and the printed component when the heated plate is heated to the predefined temperature. The three-dimensional printer also includes one or more temperature sensors that monitor a temperature of the heated plate and a control module in electronic communication with the one or more temperature sensors and the one or more heating element. The control module executes instructions to monitor the one or more temperature sensors for electronic signals indicating the temperature of the heated plate. The control module determines a current temperature of the heated plate based on the electronic signals from the one or more temperature sensors. The control module also instructs the one or more heating elements to increase, decrease, or maintain the temperature of the heated plate based on the current temperature of the heated plate.

Further areas of applicability will become apparent from the description provided herein. It should be understood that the description and specific examples are intended for purposes of illustration only and are not intended to limit the scope of the present disclosure.

BRIEF DESCRIPTION OF DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
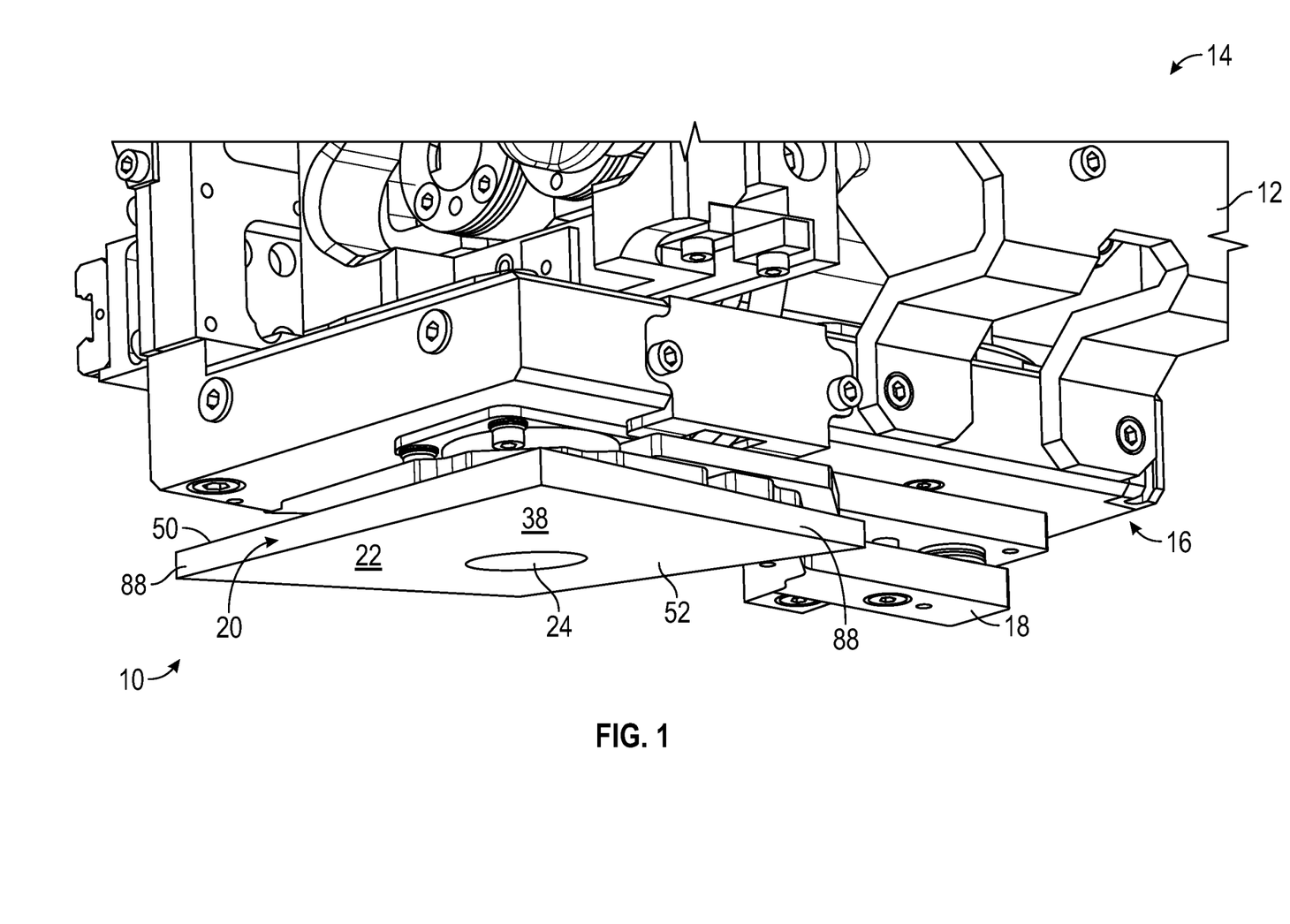
FIG. 1 is a perspective view illustrating a bottom portion of a print head, a tool head, a heated plate, and a mounting fixture for the heated plate of a three-dimensional printer, according to an exemplary embodiment.
Figure 2:
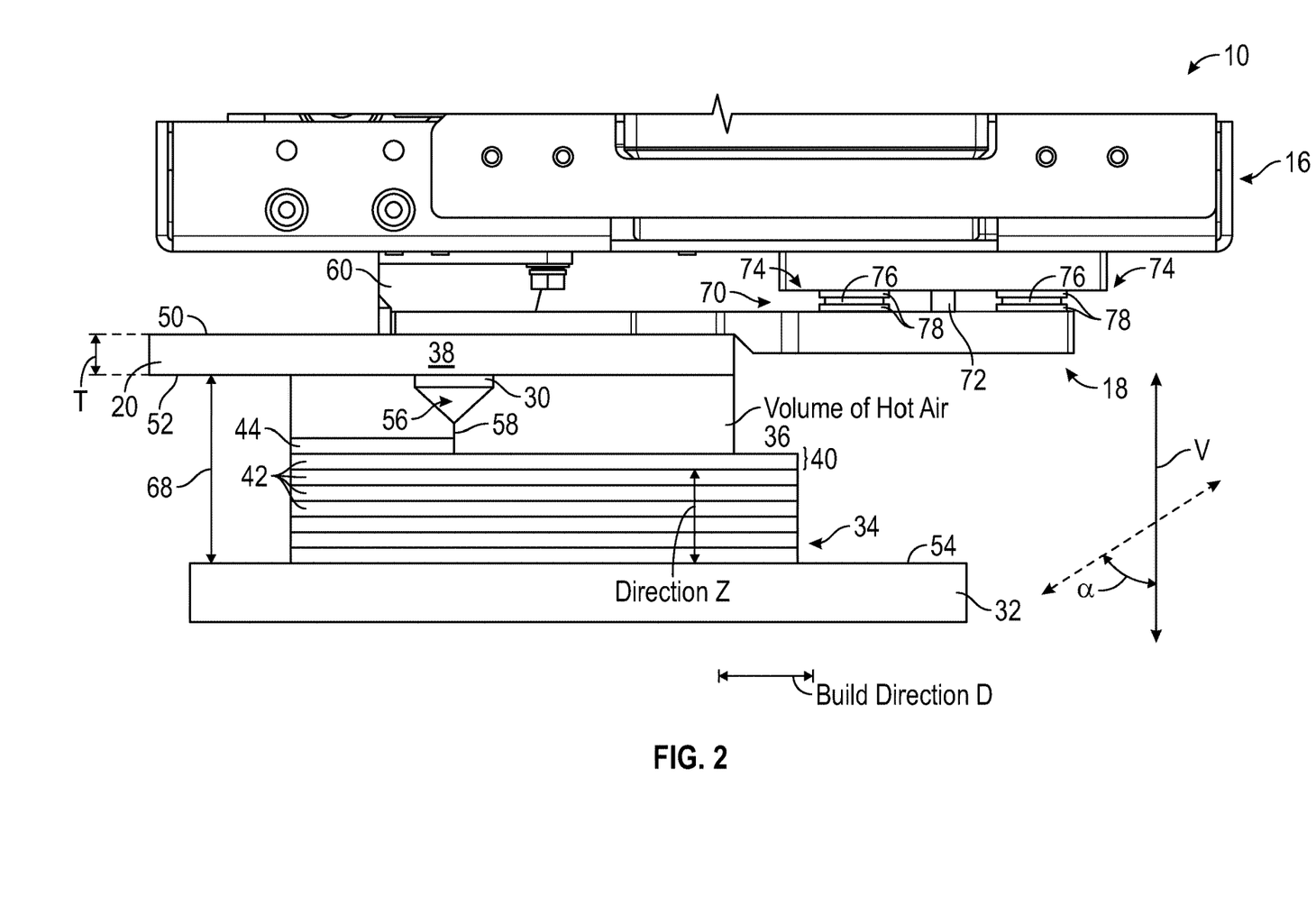
FIG. 2 is a side view of the tool head, the heated plate, and the mounting fixture for the heated plate seen in FIG. 1, as well as a heated nozzle and a printed component, according to an exemplary embodiment.

The present disclosure is directed to a heated plate for a three-dimensional printer that creates a volume of hot air for locally reheating a portion of a printed component, thereby improving the interlayer bonding between successive layers of the printed component. Referring now to FIG. 1, a perspective view of a bottom portion 12 of a print head 14 that is part of a three-dimensional printer 10 is illustrated. The three-dimensional printer 10 includes a tool head 16 located at the bottom portion 12 of the print head 14, a mounting fixture 18, and a heated plate 20. The mounting fixture is located beneath the tool head 16 and attaches the heated plate 20 to the tool head 16 of the three-dimensional printer 10. The heated plate 20 includes a main body 22 defining an opening 24. FIG. 2 is a side view of the tool head 16, the mounting fixture 18, and the heated plate 20 shown in FIG. 1 in addition to a heated nozzle 30, a build substrate 32, and a printed component 34 that is presently being generated by the three-dimensional printer 10. Referring to FIG. 2, a volume of hot air 36 is created between the heated plate 20 and the printed component 34 when at least a portion of the heated plate 20 is heated to a predefined temperature.

As explained below, the volume of hot air 36 is located between a lower surface 52 of the heated plate 20 and a portion 40 of the printed component 34. Specifically, the portion 40 of the printed component 34 includes one or more successive layers 42 of the printed component 34 most recently deposited by the heated nozzle 30. The volume of hot air 36 is at an air temperature that locally reheats the portion 40 of the printed component 34 to a fusing temperature. When reheated to the fusing temperature, the one or more successive layers 42 of the printed component 34 bond to a current layer 44 presently being extruded by the heated nozzle 30, which in turn improves the interlayer bonding between the successive layers 42 of the printed component 34. Improving the interlayer bonding between the successive layers 42 improve the tensile strength of the printed component 34 in a Z direction. As seen in FIG. 2, the Z direction is perpendicular to a build direction D of the printed component 34. In some embodiments, the printed component 34 includes near-isotropic tensile strength because of the improved interlayer bonding.

Referring specifically to FIG. 2, the build substrate 32 defines a surface 54 that supports the printed component 34. The heated nozzle 30 includes a nozzle body 56. The heated nozzle 30 is configured to deposit an extruded build material 58 upon either the build substrate 32 or the printed component 34. Specifically, the build material 58 may be in the form of a thermoplastic filament that fed into the print head 14 through a receiver (not shown in the figures) that is part of the print head 14 (FIG. 1).

Referring to both FIGS. 1 and 2, the opening 24 defined by the main body 22 of the heated plate 20 is shaped to receive the nozzle body 56 of the heated nozzle 30. The heated plate 20 is constructed of a thermally conductive material such as, for example, aluminum or steel. An outermost surface 38 of the heated plate 20 is covered with black thermal paint so the heated plate 20 functions as a black body. In an embodiment, the heated plate 20 includes a thickness T (seen in FIG. 2) that ranges from about 1 to about 20 millimeters. In some embodiments, the three-dimensional printer 10 may include a part blower duct 60 (FIG. 2) that surrounds the heated nozzle 30 (FIG. 2), where the part blower duct 60 generates air that is directed towards the printed component 34 (FIG. 2). In particular, the part blower duct 60 may be used to provide air that cools relatively smaller features of the printed component 34.

Continuing to refer to both FIGS. 1 and 2, the heated plate 20 includes an upper surface 50 and the lower surface 52. The upper surface 50 of the heated plate 20 faces the tool head 16 of the three-dimensional printer 10, and the lower surface 52 of the heated plate 20 faces the surface 54 of the build substrate 32 supporting the printed component 34. As seen in FIG. 2, the lower surface 52 of the heated plate 20 is oriented parallel with respect to the surface 54 of the build substrate 32. In the example as shown in FIG. 2, the lower surface 52 of the heated plate 20 and the surface 54 of the build substrate 32 are both oriented perpendicular with respect to a vertical line V that is oriented straight up and down. That is, the lower surface 52 of the heated plate 20 and the surface 54 of the build substrate 32 are both oriented flat. However, it is to be appreciated that the surface 54 of the build substrate 32 may be oriented at an angle depending upon the specific requirements and geometry of the printed component 34. For example, the surface 54 of the build substrate 32 may be tilted at an angle α relative to the vertical line V. In this example, since the lower surface 52 of the heated plate 20 is parallel with the surface 54 of the build substrate 32, the heated plate 20 is also tilted at the angle α.

The mounting fixture 18 not only attaches the heated plate 20 to the tool head 16, but also orients the heated plate 20 parallel with respect to the surface 54 of the build substrate 32. Referring specifically to FIG. 2, the mounting fixture 18 includes an adjustment assembly 70 for adjusting a vertical distance 68 measured between the lower surface 52 of the heated plate 20 and the surface 54 of the build substrate 32. In embodiments, the vertical distance 68 ranges from about 0.5 millimeters to about 5 millimeters. The vertical distance 68 is determined based on several factors that include, but are not limited to, the temperature of the lower surface 52 of the heated plate 20, the heat absorption of the build material 58, a required temperature of the build material 58, print speed, and the geometry of the printed component 34.

The adjustment assembly 70 includes a bolt 72 disposed in between two spring washer assemblies 74. The bolt 72 secures the mounting fixture 18 to the tool head 16. The spring washer assemblies 74 each include a pin 76 and a plurality of spring washers 78 stacked on top of each other. As the bolt 72 is tightened, the pins 76 will slide upwardly, and the plurality of spring washers 78 will compress against one another, which in turn increases the distance 68 between the lower surface 52 of the heated plate 20 and the surface 54 of the build substrate 32.

Figure 3:
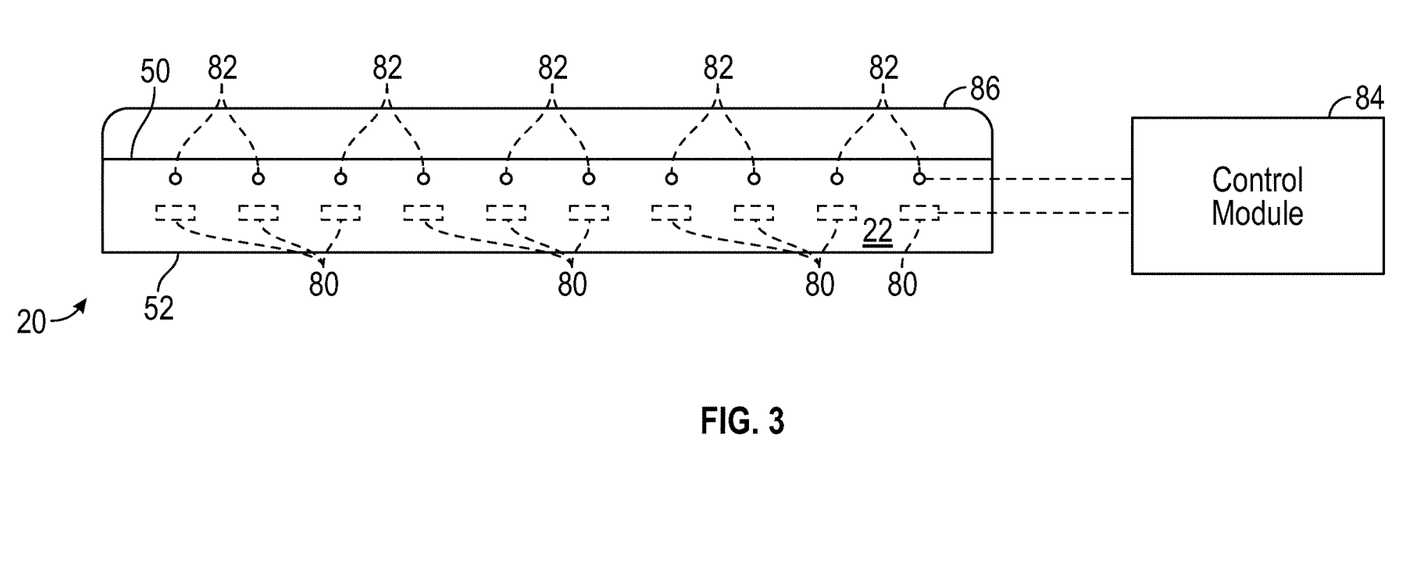
FIG. 3 is a schematic diagram of the heated plate including one or more heating elements and one or more temperature sensors in electronic communication with a control module, according to an exemplary embodiment.

FIG. 3 is a schematic diagram of the heated plate 20 including one or more heating elements 80 and one or more temperature sensors 82 that are embedded within the main body 22 of the heated plate 20. The one or more heating elements 80 and the one or more temperature sensors 82 are in electronic communication with a control module 84 that is part of the three-dimensional printer 10 (FIG. 1). The one or more heating elements 80 are configured to heat at least a portion of the heated plate 20 to a predefined temperature. As explained below, the volume of hot air 36 (seen in FIG. 2) is created between the heated plate 20 and the printed component 34 when at least a portion of the heated plate 20 is heated to the predefined temperature. It is to be appreciated that print speed and geometry of the printed component 34 may change during the print cycle. Accordingly, the predetermined temperature may be modulated during a particular print cycle as well to accommodate the changes in print speed and part geometry. As also explained below, the one or more heating elements 80 may heat the entire heated plate 20 to the predetermined temperature or, in the alternative, may only heat a portion of the heated plate 20 to the predefined temperature.

Although FIG. 3 illustrates the one or more heating elements 80 are embedded within the main body 22 of the heated plate 20, it is to be appreciated that the one or more heating elements 80 may also be disposed along the upper surface 50 of the heated plate 20 or along one or more side surfaces 88 (FIG. 1) of the heated plate 20 as well. The one or more heating elements 80 may be any type of element that generates heat such as, for example, a heater cartridge, resistive heaters, or nichrome wires. In another embodiment, the one or more heating elements 80 are not embedded within the main body 22 of the heated plate 20 or disposed along the upper or side surfaces 50, 88, and instead is positioned in a location adjacent to the heated plate 20. For example, the heating element 80 may be an infrared lamp positioned adjacent to the heated plate 20, where the infrared lamp emits infrared radiation.

In the example as shown in FIG. 3, the one or more temperature sensors 82 are also embedded within the main body 22 of the heated plate 20. However, it is to be appreciated that FIG. 3 is merely exemplary in nature, and the temperature sensors 82 may also be placed along the upper surface 50 or along the side surfaces 88 of the heated plate 20 instead. The control module 84 monitors the one or more temperature sensors 82 for electronic signals indicating the temperature of the heated plate 20. More specifically, the electronic signals indicate the temperature of the lower surface 52 of the heated plate 20. It is to be appreciated that the upper surface 50 of the heated plate 20 may be kept cooler than the lower surface 52 of the heated plate 20, and the lower surface 52 of the heated plate 20 is used to heat the volume of hot air 36 (FIG. 2). In an embodiment, a layer of insulation 86 is disposed along the upper surface 50 of the heated plate 20 to minimize an amount of heat loss of the heated plate 20. In embodiments, the layer of insulation 86 is constructed of materials such as, but not limited to, ceramic coatings, mica sheets, or high-temperature foam.

The control module 84 determines a current temperature of the lower surface 52 of the heated plate 20 based on the electronic signals received from the one or more temperature sensors 82, and instructs the one or more heating elements 80 to increase, decrease, or maintain the temperature of the heated plate 20 based on the current temperature of the lower surface 52 the heated plate 20. Specifically, in an embodiment, the control module 84 instructs the one or more heating elements 80 to heat an entire portion of the lower surface 52 heated plate 20 to the predefined temperature. However, it is to be appreciated that the one or more heating elements 80 may heat only a portion of the lower surface 52 of the heated plate 20 to the predefined temperature based on the geometry of the printed component 34.

Figure 4:
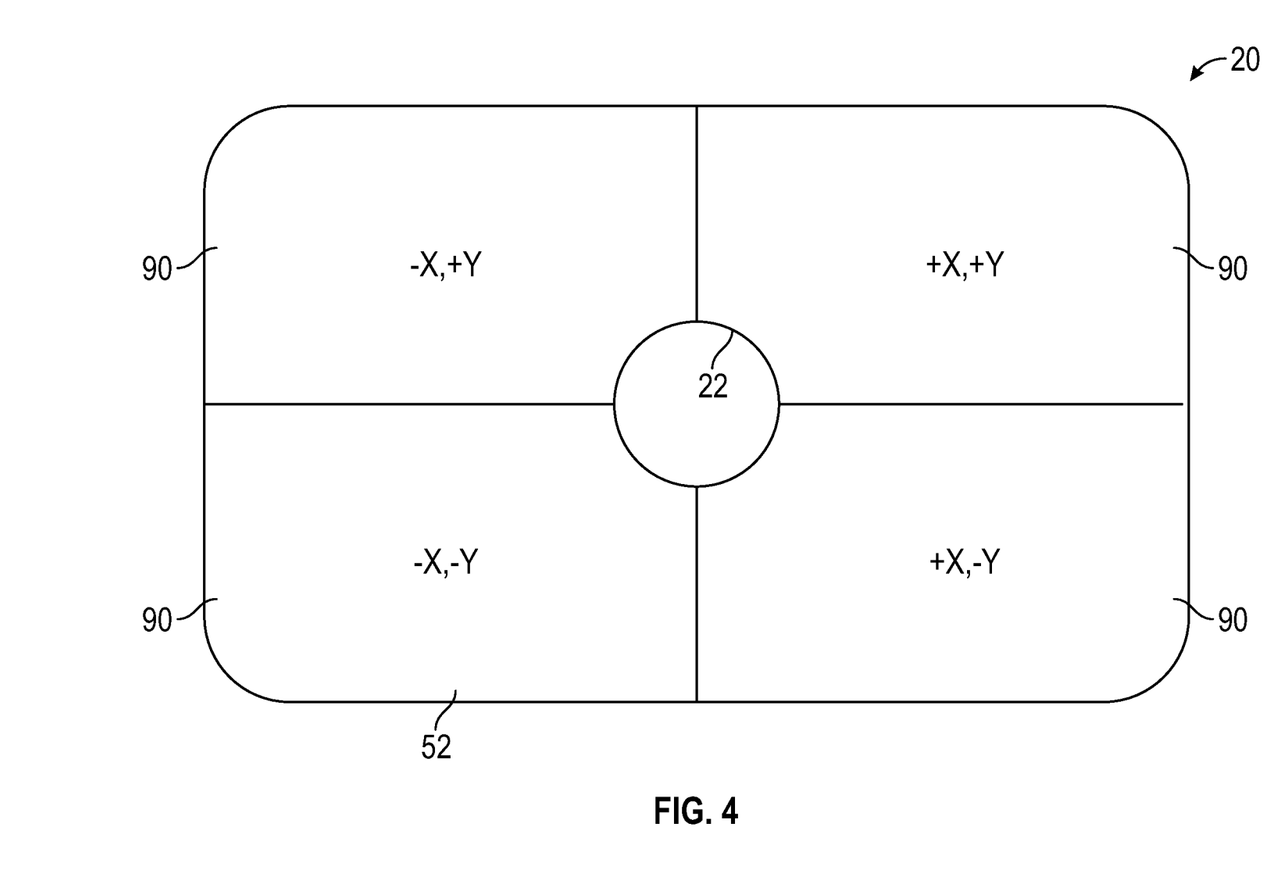
FIG. 4 is a bottom view of the heated plate divided into sections, according to an exemplary embodiment.

FIG. 4 is a bottom view of the heated plate 20 shown in FIGS. 1 and 2, illustrating the lower surface 52. The lower surface 52 of the heated plate is divided into one or more sections 90. In the example as shown in FIG. 4, the lower surface 52 is divided into four sections 90, which are labeled as quadrants+x+y, −x+y, −x, −y, and +x−y. Referring to FIGS. 3 and 4, in an embodiment the control module 84 instructs the one or more heating elements 80 to heat one or more sections 90 of the heated plate 20 to the predefined temperature. For example, only the +x+y section may be heated to the predefined temperature, while the remaining three sections 90 remain unheated.

Figure 5A:
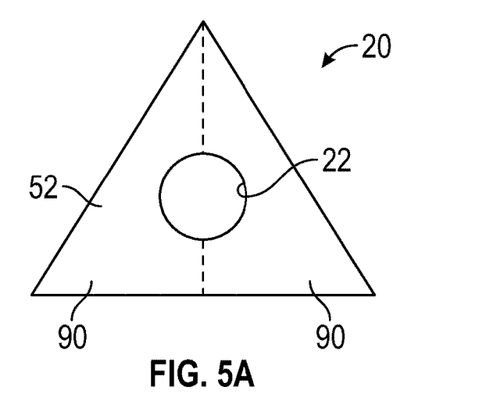
FIGS. 5A-5D illustrate various profiles that may be used for the heated plate, according to an exemplary embodiment.
Figure 5B:
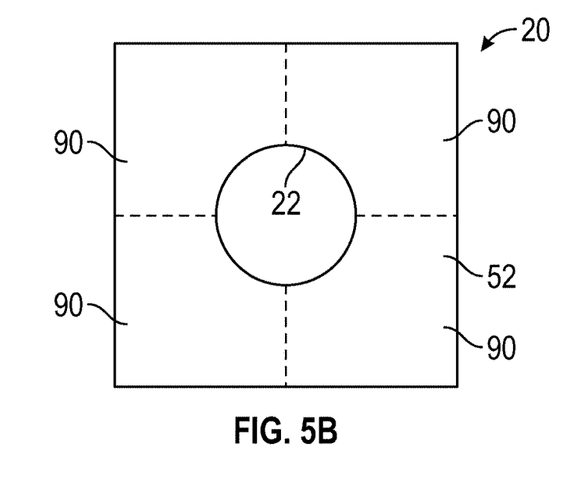
Figure 5C:
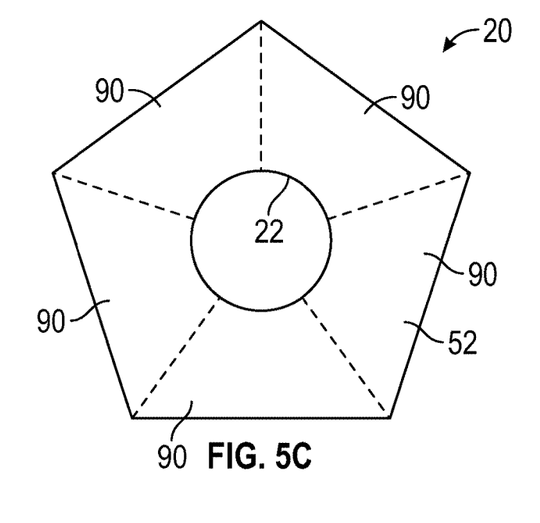
Figure 5D:
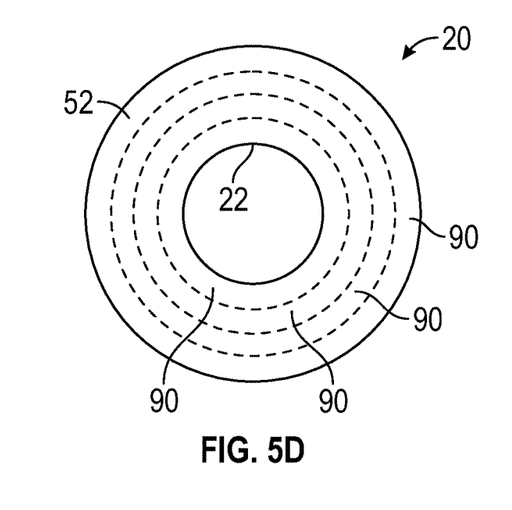

Although FIG. 4 illustrates the heated plate 20 including a rectangular profile, it is to be appreciated the heated plate 20 may include any number of different profiles. In the examples as shown in FIGS. 5A-5C, the heated plate 20 includes a variety of regularly shaped polygon profiles. For example, FIG. 5A illustrates the heated plate 20 including a triangular profile, FIG. 5B illustrates the heated plate 20 including a square profile and FIG. 5C illustrates the heated plate 20 including a pentagon profile. In the embodiment as shown in FIG. 5D, the heated plate 20 includes a circular profile. In the examples as shown in FIGS. 5A-5C, the lower surface 52 of the heated plate 20 is divided into equal sections 90 that include identical areas. However, in the embodiment as shown in FIG. 5D, the lower surface 52 of the heated plate 20 is divided into concentric sections 90.

Turning back to FIG. 2, when the lower surface 52 of the heated plate 20 is at the predetermined temperature, the volume of hot air 36 between the lower surface 52 of the heated plate 20 and the printed component 34 is at an air temperature that heats the portion 40 of the printed component 34 located on the build substrate 32 to a fusing temperature. The fusing temperature is a predefined margin below a heat deflection temperature of the build material 58. It is to be appreciated that the fusing temperature is close to but may not be equal to or exceed the heat deflection temperature of the build material 58. This is because heating the build material 58 to a temperature equal to or greater than the heat deflection temperature causes the printed component 34 to lose its respective shape or deform under its own weight. In an embodiment, the predefined margin ranges from about 10 to about 15 degrees Celsius, which ensures that the printed component 34 retains its respective shape. As mentioned above, when the one or more successive layers 42 of the printed component 34 are heated to the fusing temperature, the one or more successive layers 42 of the printed component 34 bond to a current layer 44 presently being extruded by the heated nozzle 30. This improves the thermal history of the printed component 34. Improving the thermal history results in enhanced interlayer bonding between the successive layers 42 of the printed component 34, which in turn increases the tensile strength of the printed component 34 in the Z direction.

Referring generally to the figures, the heated plate provides various technical effects and benefits by providing a simple, cost-effective approach to improve the z-directional strength of the printed component. Preliminary results showed that the printed component maintained a 10° C. higher temperature during printing when using the heated plate versus a printed component that did not use the heated plate. Specifically, the heated plate creates a volume of hot air located between the heated plate and the printed component. The volume of hot air locally reheats the portion of the printed component to the fusing temperature. When reheated to the fusing temperature, the one or more successive layers of the printed component bond to a current layer presently being extruded by the heated nozzle, which improves the z-directional strength of the printed component.

The control module may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the control module may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A three-dimensional printer for generating a printed component, the three-dimensional printer comprising:

a build substrate defining a surface that supports the printed component;

a print head defining a bottom portion and a tool head, wherein the tool head is located underneath the bottom portion of the print head;

a heated nozzle including a nozzle body, wherein the heated nozzle is configured to deposit a build material upon either the build substrate or the printed component;

a heated plate including one or more heating elements and a main body that defines an opening for receiving the nozzle body of the heated nozzle, wherein the one or more heating elements are configured to heat at least a portion of the heated plate to a predefined temperature, wherein a volume of hot air is created between the heated plate and the printed component when the heated plate is heated to the predefined temperature; and a vertically adjustable mounting fixture located beneath the tool head, wherein the vertically adjustable mounting fixture attaches the heated plate to the tool head and includes an adjustment assembly for adjusting a vertical distance measured between a lower surface of the heated plate and the surface of the build substrate.

2. The three-dimensional printer of claim 1, further comprising a control module in electronic communication with the one or more heating elements of the heated plate.

3. The three-dimensional printer of claim 2, further comprising one or more temperature sensors in electronic communication with the control module, wherein the one or more temperature sensors monitor a temperature of the heated plate.

4. The three-dimensional printer of claim 3, wherein the control module executes instructions to:

monitor the one or more temperature sensors for electronic signals indicating the temperature of the heated plate;

determine a current temperature of the heated plate based on the electronic signals from the one or more temperature sensors; and instruct the one or more heating elements to increase, decrease, or maintain the temperature of the heated plate based on the current temperature of the heated plate.

5. The three-dimensional printer of claim 4, wherein the control module executes instructions to:

instruct the one or more heating elements to heat an entire portion of a lower surface the heated plate to the predefined temperature.

6. The three-dimensional printer of claim 4, wherein the heated plate includes a lower surface that is divided into one or more sections.

7. The three-dimensional printer of claim 6, wherein the control module executes instructions to:

instruct the one or more heating elements to heat the one or more sections of the lower surface of the heated plate to the predefined temperature.

8. The three-dimensional printer of claim 7, wherein the lower surface of the heated plate is divided into equal sections.

9. The three-dimensional printer of claim 7, wherein the lower surface of the heated plate is divided into concentric sections.

10. The three-dimensional printer of claim 1, wherein the volume of hot air between the heated plate and the printed component is at an air temperature that heats a portion of the printed component located on the build substrate to a fusing temperature.

11. The three-dimensional printer of claim 10, wherein the fusing temperature is a predefined margin below a heat deflection temperature of the build material.

12. The three-dimensional printer of claim 1, wherein the heated plate includes one of the following: a triangular profile, a square profile, a rectangular profile, a pentagon profile, and a circular profile.

13. The three-dimensional printer of claim 1, wherein the adjustment assembly includes a bolt disposed between two spring washer assemblies, wherein the bolt secures the vertically adjustable mounting fixture to the tool head.

14. The three-dimensional printer of claim 13, wherein each spring washer assembly includes a pin and a plurality of stacked spring washers.

15. A three-dimensional printer for generating a printed component, the three-dimensional printer comprising:

a build substrate defining a surface that supports the printed component;

a print head defining a bottom portion and a tool head, wherein the tool head is located underneath the bottom portion of the print head;

a heated nozzle including a nozzle body, wherein the heated nozzle is configured to deposit a build material upon either the build substrate or the printed component;

a heated plate including one or more heating elements and a main body that defines an opening for receiving the nozzle body of the heated nozzle, wherein the one or more heating elements are configured to heat at least a portion of the heated plate to a predefined temperature, wherein a volume of hot air is created between the heated plate and the printed component when the heated plate is heated to the predefined temperature;

a vertically adjustable mounting fixture located beneath the tool head, wherein the vertically adjustable mounting fixture attaches the heated plate to the tool head and includes an adjustment assembly for adjusting a vertical distance measured between a lower surface of the heated plate and the surface of the build substrate;

one or more temperature sensors that monitor a temperature of the heated plate; and a control module in electronic communication with the one or more temperature sensors and the one or more heating element, wherein the control module executes instructions to:

monitor the one or more temperature sensors for electronic signals indicating the temperature of the heated plate;

determine a current temperature of the heated plate based on the electronic signals from the one or more temperature sensors; and instruct the one or more heating elements to increase, decrease, or maintain the temperature of the heated plate based on the current temperature of the heated plate.

16. The three-dimensional printer of claim 15, wherein the control module executes instructions to:

instruct the one or more heating elements to heat an entire portion of a lower surface the heated plate to the predefined temperature.

17. The three-dimensional printer of claim 16, wherein the heated plate includes a lower surface that is divided into one or more sections.

18. The three-dimensional printer of claim 17, wherein the control module executes instructions to:
   instruct the one or more heating elements to heat the one or more sections of the lower surface of the heated plate to the predefined temperature.

19. The three-dimensional printer of claim 15, wherein the volume of hot air between the heated plate and the printed component is at an air temperature that heats a portion of the printed component located on the build substrate to a fusing temperature.

20. The three-dimensional printer of claim 19, wherein the fusing temperature is a predefined margin below a heat deflection temperature of the build material.

* * * * *